United States Patent
Nagano

(10) Patent No.: US 8,121,390 B2
(45) Date of Patent: Feb. 21, 2012

(54) PATTERN INSPECTION METHOD, PATTERN INSPECTION APPARATUS AND SEMICONDUCTOR DEVICE MANUFACTURING METHOD

(75) Inventor: Osamu Nagano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 877 days.

(21) Appl. No.: 12/179,312

(22) Filed: Jul. 24, 2008

(65) Prior Publication Data
US 2009/0041334 A1 Feb. 12, 2009

(30) Foreign Application Priority Data
Jul. 30, 2007 (JP) .................... 2007-197786

(51) Int. Cl.
*G06K 9/00* (2006.01)
(52) U.S. Cl. ........................................ 382/141
(58) Field of Classification Search .............. None
See application file for complete search history.

(56) References Cited

U.S. PATENT DOCUMENTS
7,676,078 B2 * 3/2010 Fukuhara ............... 382/147
2006/0245636 A1 11/2006 Kitamura et al.

FOREIGN PATENT DOCUMENTS
JP 2000-337846 12/2000
JP 2005-277395 10/2005

OTHER PUBLICATIONS
Notification of Reasons for Rejection issued by the Japanese Patent Office on Jul. 15, 2011, for Japanese Patent Application No. 2007-197786, and English-language translation thereof.

* cited by examiner

*Primary Examiner* — Tu Nguyen
(74) *Attorney, Agent, or Firm* — Finnegan, Henderson, Farabow, Garrett & Dunner, L.L.P.

(57) ABSTRACT

A pattern inspection method includes scanning a substrate on which patterns are formed with a charged beam, detecting a charged particle generated from the surface of the substrate, and then acquiring an image of the patterns; comparing the image of the patterns with CAD data for the patterns to inspect the patterns; measuring the dimensions of an arbitrary pattern using the image; calculating a statistic of a dimensional value of the arbitrary pattern obtained by the measurement; judging the necessity of a correction on the basis of the calculated statistic; and performing correction processing when the correction is judged to be necessary.

19 Claims, 6 Drawing Sheets

PATTERN INSPECTION METHOD, PATTERN INSPECTION APPARATUS AND SEMICONDUCTOR DEVICE MANUFACTURING METHOD

CROSS REFERENCE TO RELATED APPLICATION

This application claims benefit of priority under 35 USC §119 to Japanese patent application No. 2007-197786, filed on Jul. 30, 2007, the contents of which are incorporated by reference herein.

BACKGROUND OF THE INVENTION

1. Field of the Invention

The present invention relates to a pattern inspection method, a pattern inspection apparatus and a semiconductor device manufacturing method, and is intended for a pattern inspection using, for example, a charged particle beam.

2. Related Background Art

In an inspection of a circuit pattern of a semiconductor device, a so-called Die-to-Database inspection using a scanning electron microscope has recently been in wide use. The Die-to-Database inspection comprises scanning a wafer with an electron beam and then detecting a secondary electron, a reflection electron and a back scattering electron generated from the surface of the wafer to acquire an SEM image of a circuit pattern, measuring the dimensions of the pattern in the SEM image referring to computer aided design (CAD) data, and comparing the measurement with the CAD data to inspect its quality.

The inspection with the electron beam requires a long time, and there is therefore a demand for a faster inspection in particular. One method available is to increase a scan region of the electron beam to collectively acquire an SEM image of a wide range. Another method is to increase a probe current to scan with the electron beam at a high velocity, and obtain a satisfactory S/N ratio even with a small accumulation number.

However, when the scan region is wide-ranging, the diameter of the beam changes between the center and end of the scan region due to the deflection and aberration of the electron beam, so that the pattern dimensions obtained from the SEM image greatly vary between the center and end of the scan region. The use of such an SEM image not only increases a measurement error, but also frequently causes pseudo-defects in parts where the divergence from the CAD data is great in the inspection of the comparison with the CAD data.

In order to solve the foregoing problem, there has been proposed a method comprising: acquiring an image in a region where there are patterns of the same dimensions and of uniform density on a wafer, previously finding a variation of the dimensions dependent on the position in the scan region, and using the variation to correct the pattern dimensions (e.g., Japanese Patent Laid Open (kokai) No. 2005-277395).

However, the diameter of the electron beam greatly changes with time depending on the size of the scan region and the length of inspection time. Thus, if, for example, a high probe current is used to carry out a long-time inspection or measurement, a device drift (e.g., defocus and astigmatism) occurs which is mainly caused by, for example, a charge-up. This not only changes the beam diameter with time and fluctuates, during an inspection, the variation of the dimensions dependent on the position in the scan region, but also varies the pattern dimensions in an inspection region and precludes a sufficient correction, leading to problems of measurement errors and pseudo-defects.

To correct the above-mentioned change of the beam diameter with time, Japanese Patent Laid Open (kokai) No. 2005-277395 has also proposed a method to create a part in which inspections are conducted twice in the inspection region, and make a correction using dimensions measured in the first and second inspections.

However, in the method proposed in Japanese Patent Laid Open (kokai) No. 2005-277395, the dimensional variation with time which depends on the position in the scan region can not be corrected, and the dimensions still vary with time even during the second inspection, so that it has been impossible to obtain sufficient correction accuracy.

For the defocus and astigmatism, there have been proposed a method to make a real-time correction in an inspection process, and a method to make a correction at regular intervals predetermined in the inspection region. However, the real-time correction method increases the inspection time, and the method of correcting at regular intervals is not capable of making a sufficient correction of suddenly and unexpectedly caused defocus and astigmatism.

Furthermore, when the scan region is large, it is highly likely that patterns greatly different in dimensions are included in the same scan region in an actual pattern on the wafer. In that case, if the measured dimensions including errors in the scan region are corrected using measurement values obtained from the patterns greatly different in dimension, this involves a dimensional bias produced depending on how the edge of the SEM image appears depending on the dimensions of the pattern, and a change in the pattern dimensions on the wafer which is produced depending on the size of a design pattern, leading to a problem of an inhibited increase of correction accuracy.

SUMMARY OF THE INVENTION

According to a first aspect of the present invention, there is provided a pattern inspection method comprising:

scanning a substrate on which patterns are formed with a charged beam, detecting a charged particle generated from the surface of the substrate, and then acquiring an image of the patterns;

comparing the image of the patterns with CAD data for the patterns to inspect the patterns;

measuring the dimensions of an arbitrary pattern using the image;

calculating a statistic of a dimensional value of the arbitrary pattern obtained by the measurement;

judging the necessity of a correction on the basis of the calculated statistic; and performing correction processing when the correction is judged to be necessary.

According to a second aspect of the present invention, there is provided a pattern inspection apparatus comprising:

a pattern image acquisition unit, the pattern image acquisition unit scanning a substrate on which a plurality of patterns are formed with a charged beam, and detecting a charged particle generated from the surface of the substrate, and then acquiring an image of the patterns;

an inspection unit which acquires CAD data for the patterns and compares the image of the patterns with the CAD data to inspect the patterns;

a measurement unit which measures the dimensions of an arbitrary pattern using the image;

a calculation unit which calculates a statistic of a dimensional value of the arbitrary pattern obtained by the measurement;

a judgment unit which judges the necessity of a correction on the basis of the calculated statistic; and a correction unit which performs correction processing when the correction is judged to be necessary.

According to a third aspect of the present invention, there is provided a semiconductor device manufacturing method comprising carrying out a process of manufacturing a semiconductor device on a substrate when an inspection target pattern for use in the formation of the semiconductor device formed on the substrate is judged to satisfy a required specification of the semiconductor device as a result of an inspection by a pattern inspection method, the pattern inspection method including:

scanning a substrate on which patterns are formed with a charged beam, detecting a charged particle generated from the surface of the substrate, and then acquiring an image of the patterns;

comparing the image of the patterns with CAD data for the patterns to inspect the patterns;

measuring the dimensions of an arbitrary pattern using the image;

calculating a statistic of a dimensional value of the arbitrary pattern obtained by the measurement;

judging the necessity of a correction on the basis of the calculated statistic; and performing correction processing when the correction is judged to be necessary.

DETAILED DESCRIPTION OF THE INVENTION

Figure 1:
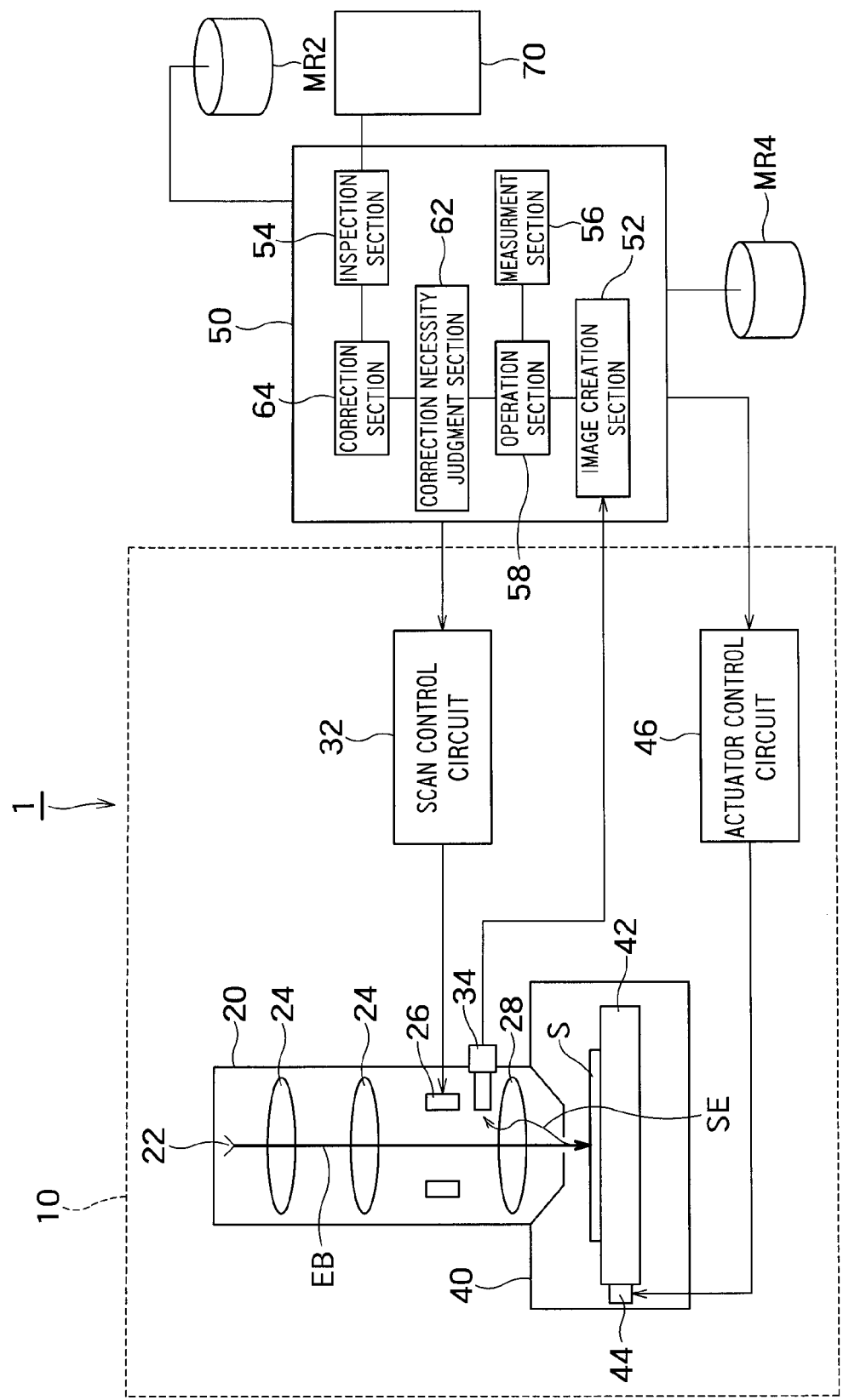
FIG. 1 is a block diagram showing a schematic configuration of one embodiment of a pattern inspection apparatus according to the present invention.

Embodiments of the present invention will be described with reference to the drawings. Described below as an example is a Die-to-Database inspection wherein an SEM image of patterns is acquired using an electron beam as a charged beam, and the acquired SEM image is compared with CAD data to inspect the quality of the patterns. It is to be noted that like reference numerals are assigned to like parts in the drawings and repeated explanations are omitted accordingly.

(1) One Embodiment of Pattern Inspection Apparatus

FIG. 1 is a block diagram showing a schematic configuration of one embodiment of a pattern inspection apparatus according to the present invention. A pattern inspection apparatus 1 shown in FIG. 1 comprises a scanning electron microscope 10, a computer 50 and a monitor 70.

The scanning electron microscope 10 includes an electron gun 22, condenser lenses 24, a deflector 26, a scan control circuit 32, an objective lens 28, a stage 42, an actuator 44, an actuator control circuit 46, and a detector 34. The electron gun 22 is provided at the top of a column 20 and emits an electron beam EB. The stage 42 is provided in a sample room 40, mounts a substrate S as a sample thereon and is movable in X and Y directions. The scan control circuit 32 is connected to the deflector 26 and the computer 50. A pattern as an inspection target is formed on the surface of the substrate S. The actuator control circuit 46 is connected to the actuator 44 and the computer 50. The detector 34 is connected to a later-described image creation section 52 of the computer 50.

The computer 50 includes the image creation section 52, a measurement section 56, an operation section 58, a correction necessity judgment section 62, a correction section 64 and an inspection section 54. The correction necessity judgment section 62 corresponds to, for example, a judgment unit in the present embodiment. Memories MR2, MR4 are connected to the computer 50. The memory MR2 stores a recipe file in which there is described a program for causing the computer 50 to execute a pattern inspection method of first and second embodiments described later. Moreover, the memory MR4 stores CAD data for the pattern as the inspection target. The monitor 70 is connected to the computer 50 to display information necessary for an inspection of, for example, an SEM image.

The electron beam EB emitted from the electron gun 22 is applied to the substrate S through the condenser lenses 24 and the objective lens 28. Further, the electron beam EB is suitably deflected in the X and Y directions by the deflector 26 in accordance with a control signal supplied from the scan control circuit 32 controlled by the computer 50. A secondary electron, a reflection electron and a back scattering electron (hereinafter simply referred to as "secondary electron, etc.") SE generated on the surface of the substrate S due to the application of the electron beam EB are detected by the detector 34. The detection signal is input to the image creation section 52 of the computer 50. The image creation section 52 then subjects the provided detection signal to image processing to create an SEM image. The scanning electron microscope 10 and the computer 50 correspond to, for example, a pattern image acquisition unit in the present embodiment. The SEM image created by the image creation section 52 is supplied to and displayed on the monitor 70. A control signal is input to the actuator 44 from the actuator control circuit 46 controlled by the computer 50, such that the stage 42 is moved in the X and Y directions. The secondary electron, etc. correspond to, for example, a charged particle in the present embodiment.

Figure 2:
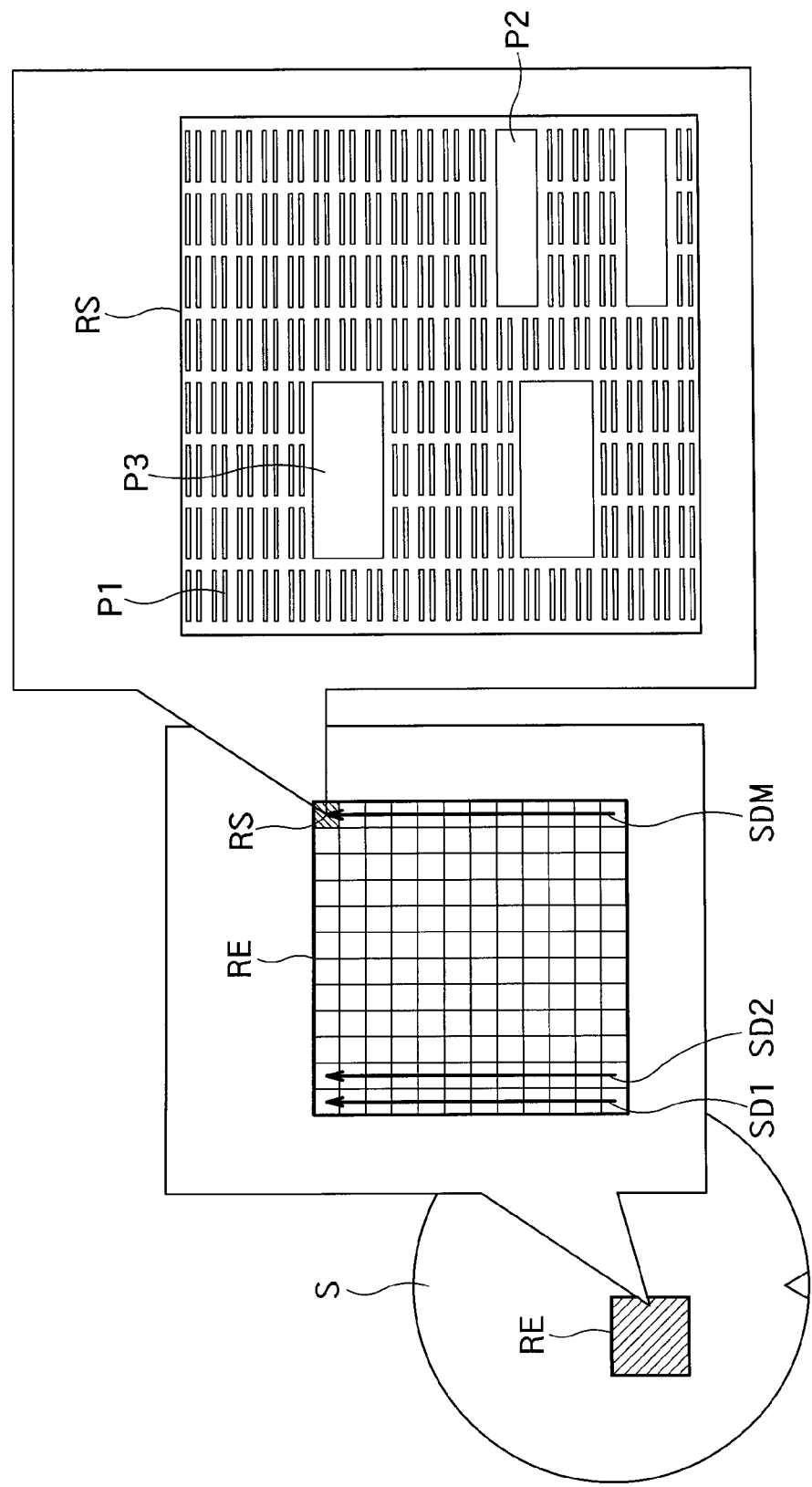
FIG. 2 is a diagram explaining the relation among a substrate, an inspection region and a scan region.

In an inspection of the patterns formed on the substrate S, a desired inspection region RE is first designated on the substrate S, as shown in FIG. 2. The inspection region RE is divided into N×M (N, M are natural numbers equal to or higher than 2) scan regions RS. In the present embodiment, the inspection is carried out by sequentially scanning with the electron beam EB up to SDM from an inspection scan direction SD1 to an inspection scan direction SD2 while repeating the acquisition of SEM images of the scan regions RS and the movement of the stage 42. Here, the scan region RS means a range of region in which the SEM images can be collectively acquired by the scanning with the electron beam EB. In the present embodiment, the scan region RS includes patterns of various dimensions such as patterns P1 to P3.

Figure 3:
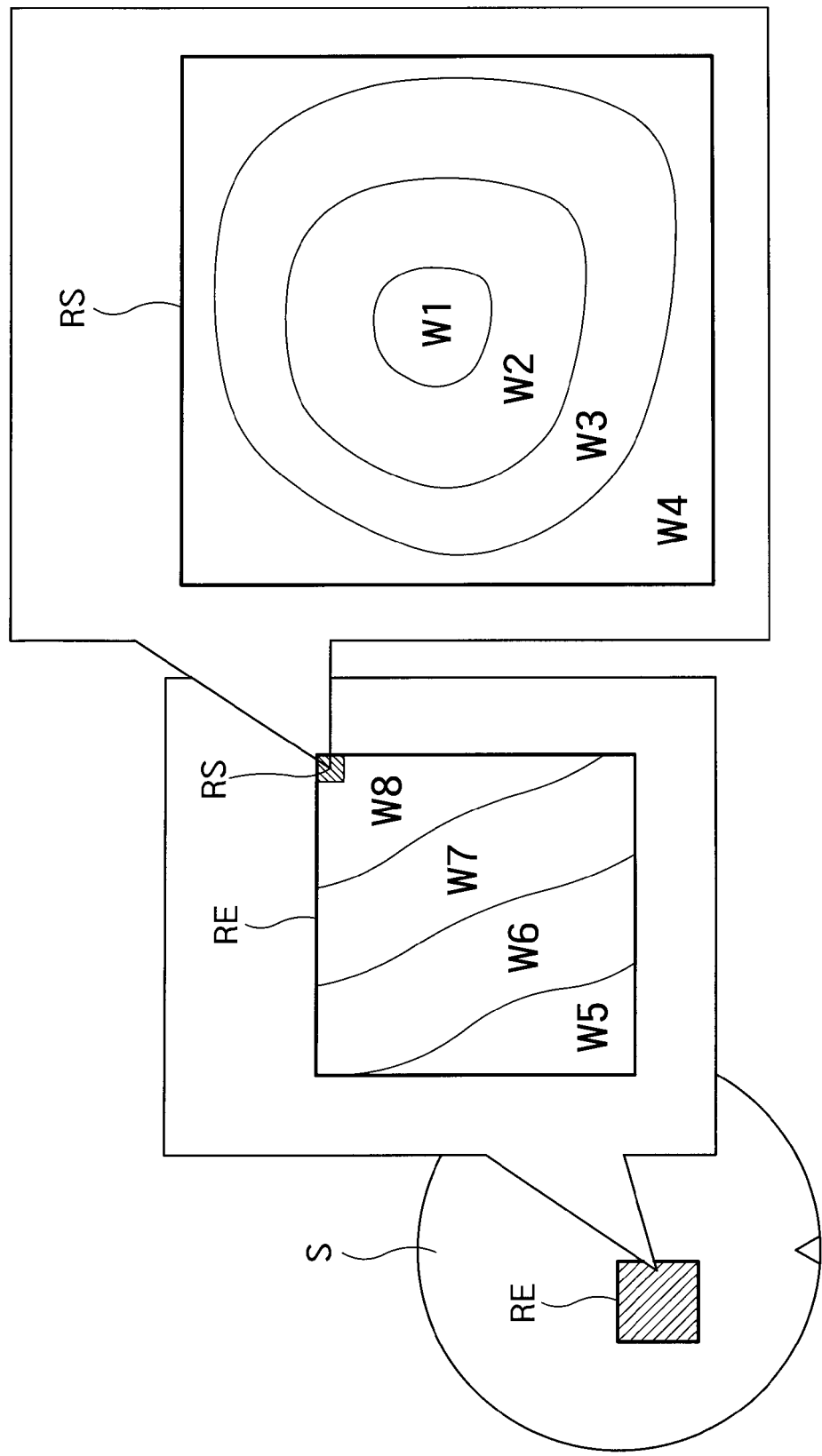
FIG. 3 is a diagram explaining the distribution of dimensional errors caused by a change in the diameter of an electron beam with time.

Here, if a long-time inspection is carried out with the electron beam EB having a high current, a change in the diameter of the electron beam EB with time causes a dimensional distribution to be changed from W1 to W4 in the range of the scan region RS and also causes the dimension to be changed from W5 to W8 with time in the inspection region RE even when there is no dimensional variation of the patterns in, for example, the inspection region RE, as shown in FIG. 3. According to the pattern inspection apparatus 1 shown in FIG. 1, such a variation of the dimensional measurement value or device drift due to the change in the diameter of the electron beam EB with time is corrected. Specific correction methods by the pattern inspection apparatus 1 are described below as the first and second embodiments of the pattern inspection method according to the present invention.

(2) First Embodiment of Pattern Inspection Method

Figure 4:
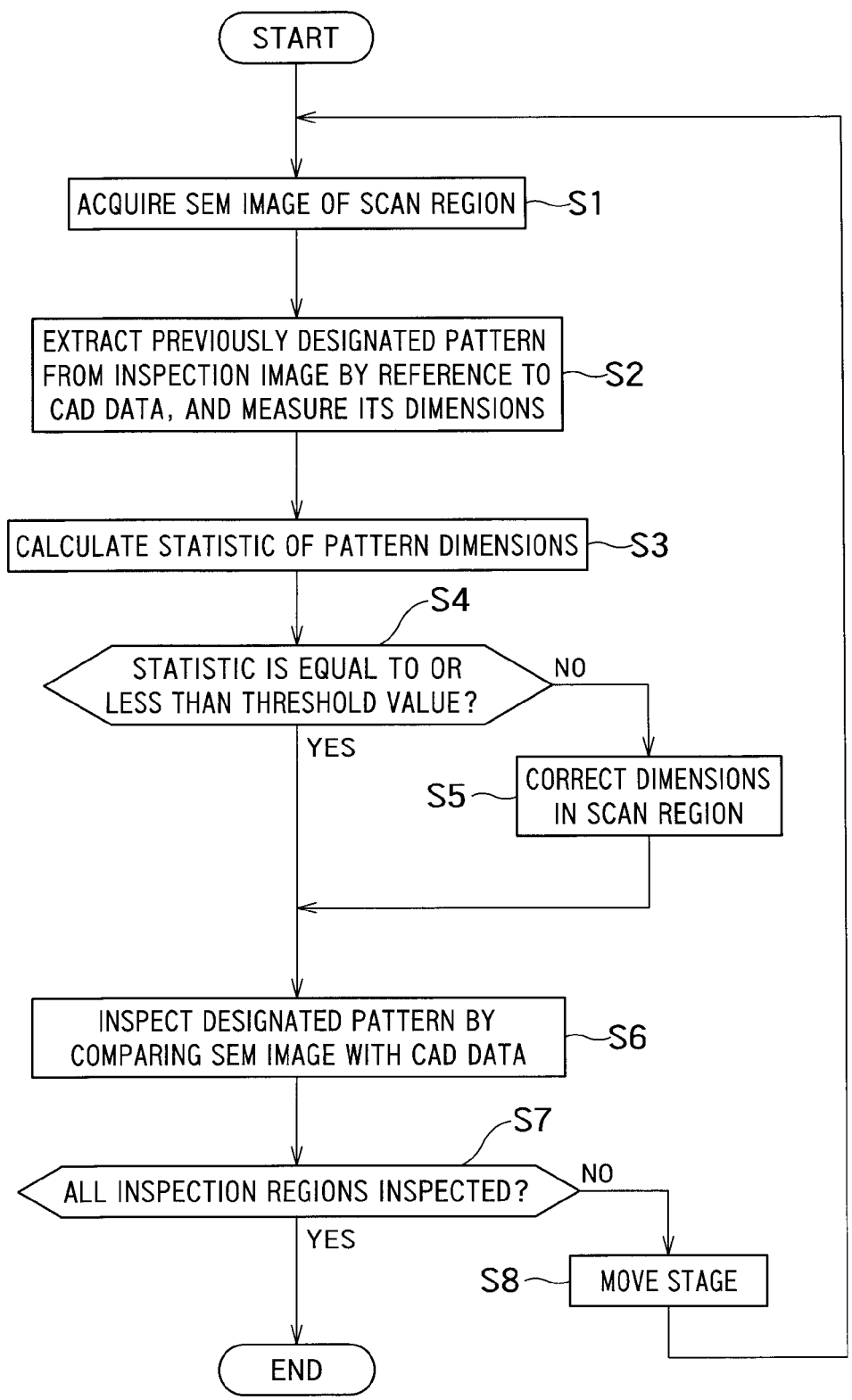
FIG. 4 is a flowchart showing a schematic procedure in a first embodiment of a pattern inspection method according to the present invention.

FIG. 4 is a flowchart showing a schematic procedure in the first embodiment of the pattern inspection method according to the present invention. As shown in FIG. 4, the scanning electron microscope 10 is first actuated by the computer 50, so that the secondary electron, etc. are detected from the scan region RS by the detector 34. Thus, an SEM image of the scan region RS is acquired after processing in the image creation section 52 (step S1).

Then, the measurement section 56 extracts an arbitrary pattern, for example, the pattern P1 (see FIG. 2) out of the patterns contained in the scan region RS from the obtained SEM image, and the dimensions of the pattern are measured (step S2). In the present embodiment, the total number of patterns P1 is extracted by reference to the CAD data. The above-mentioned arbitrary pattern may be previously designated on CAD, or an operator may observe the SEM image displayed on the monitor 70 and select the arbitrary pattern and then indicate the pattern to the measurement section 56 from an unshown input section. In the case described in the present embedment, the arbitrary pattern has been previously designated on the CAD.

Then, the operation section 58 calculates a statistic per scan region RS for the total dimensional value of the obtained patterns P1 (step S3). The statistic includes, for example, an average value, dispersion or a range.

Subsequently, the correction necessity judgment section 62 judges whether the calculated statistic is equal to or less than a prepared threshold value (step S4). When the statistic is more than the threshold value, the correction necessity judgment section 62 judges that the measurement value of the pattern P1 contains an error, and in response to this judgment, the correction section 64 corrects the dimensional measurement value (step S5). One specific example of a method of correcting the measurement value is described with reference to FIGS. 5A to 5C.

First, a pattern of designated dimensions, for example, the pattern P1 is extracted, and the scan region RS is divided into a plurality of correction amount calculation regions. In the example shown in FIG. 5B, it is divided into 16 regions. For comparison, the right part in FIG. 2 is again shown in FIG. 5A.

Figure 5:
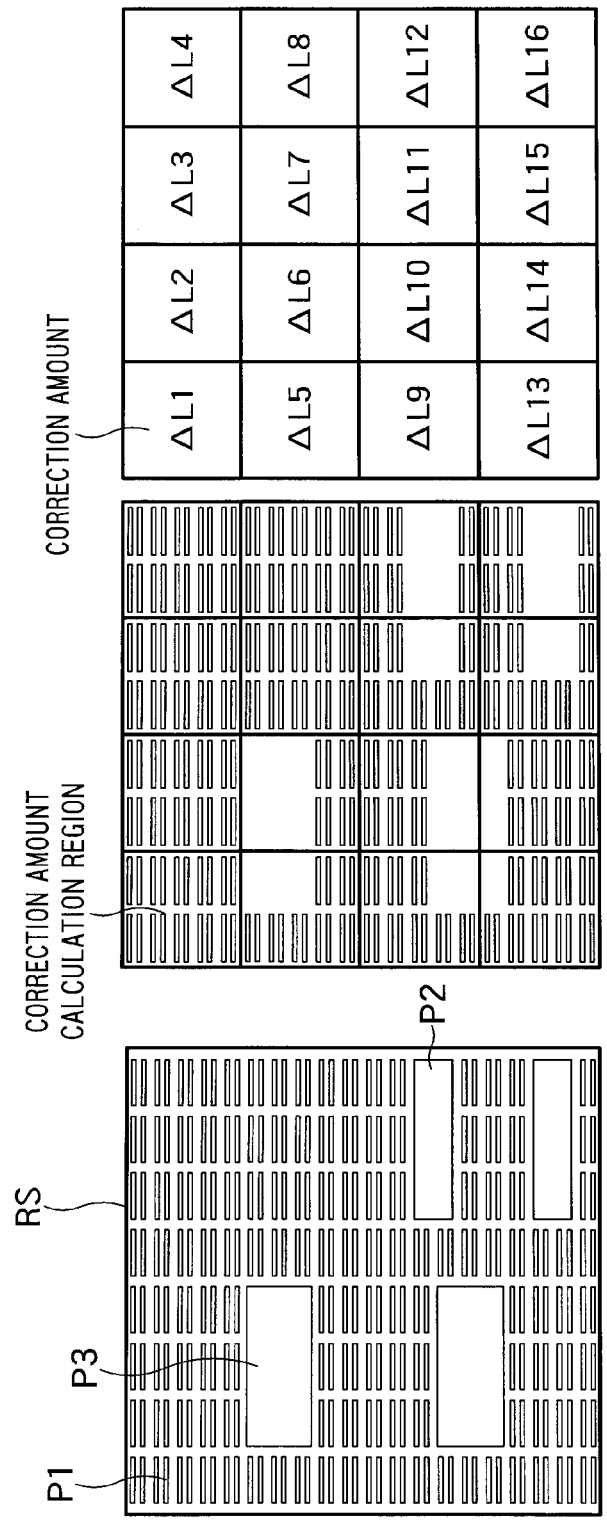
FIGS. 5A to 5C are diagrams explaining one example of a method of correcting a dimensional measurement including an error.

Then, the operation section 58 calculates the average value of the difference between a dimensional measurement of the pattern P1 and the CAD data for each correction amount calculation region, and values in which the positive and negative signs of the average values are inverted are calculated as correction amounts $\Delta L1$ to $\Delta L16$ as shown in FIG. 5C.

Then, the operation section 58 adds the correction amounts $\Delta L1$ to $\Delta L16$ to the dimensional measurements obtained in step S2 for the respective correction amount calculation regions, and the correction section 64 outputs the results of the addition as post-correction values (values for use in an inspection). In addition, the correction amounts thus obtained are stored in, for example, the memory MR4, and when the change of the beam diameter with time is determined to be negligibly small, these correction amounts can also be applied to the scan regions to be inspected later.

Returning to FIG. 4, the inspection section 54 compares the post-correction dimensional value with the CAD data, and thereby examines whether the designated pattern satisfies a required specification (step S6).

When there is a scan region which has not been inspected yet (step S7), the stage 42 is moved by the actuator control circuit 46 and the actuator 44 to shift to the next scan region (step S8). The procedure described above is repeated for all the inspection regions.

Thus, according to the present embodiment, an arbitrary pattern is extracted from the SEM image by reference to the CAD data, and the statistic of its dimensional measurement value is calculated. Then, the trend of a dimensional change is recognized in each scan region, and a reverse trend is added to the measurement value. It is thus possible to achieve a highly accurate pattern inspection in a short inspection time.

(3) Second Embodiment of Pattern Inspection Method

In the case of, for example, the pattern P1 shown in the right of FIG. 2, when there is a difference of over, for example, 10% between a dimensional value (see step S2 in FIG. 4) measured in the pattern P1 in the center of the scan region and a dimensional value measured at the end of the scan region, this should be determined to be attributed to the abnormality of the scanning electron microscope 10 rather than to the change in the diameter of the electron beam EB with time. In such a case, the accuracy of an inspection can be improved if the inspection is carried out after the correction of at least one of the focus or astigmatism of the scanning electron microscope 10. The case where the step of correcting a device drift such as the focus or astigmatism is included is described as the second embodiment of the pattern inspection method according to the present invention.

Figure 6:
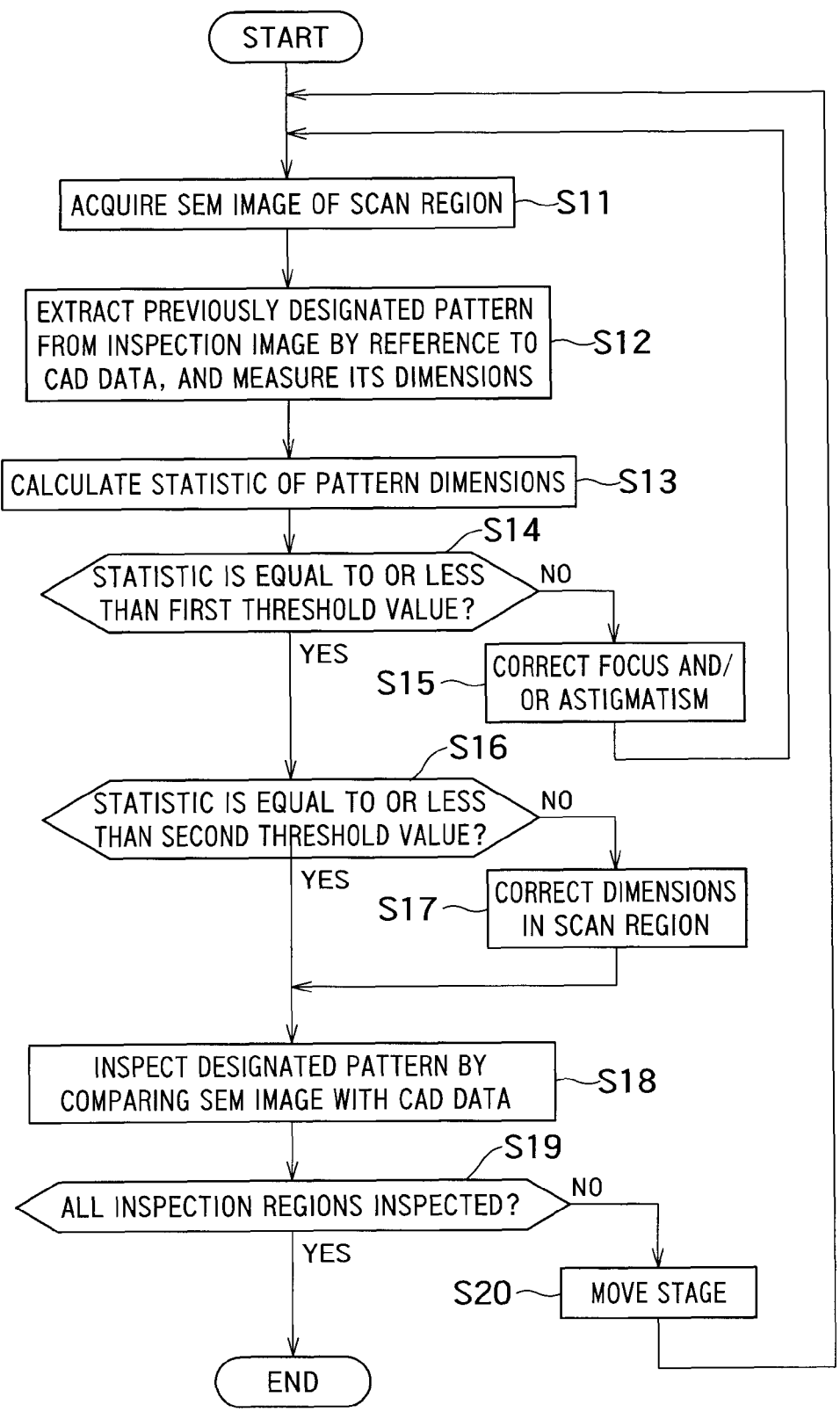
FIG. 6 is a flowchart showing a schematic procedure in a second embodiment of the pattern inspection method according to the present invention.

FIG. 6 is a flowchart showing a schematic procedure of the pattern inspection method in the present embodiment. As apparent from the contrast with FIG. 4, steps S11 to S13 are substantially the same as steps S1 to S3 shown in FIG. 4, so that 10 is simply added to the step numbers. The present embodiment is characterized in that first and second two threshold values are set as threshold values in advance, and the correction necessity judgment section 62 judges by the first threshold value whether the scanning electron microscope 10 is abnormal (step S14), and then the scanning electron microscope 10 is determined to be abnormal and the focus and/or the astigmatism is corrected (step S15) when the statistic is more than the first threshold value. Here, the second threshold value is a value similar to the threshold value in step S4 in FIG. 4, and is stricter than the first threshold value.

After the device drift of the scanning electron microscope 10 has been corrected, the step of acquiring an inspection image (step S11), the step of extracting a designated pattern and measuring the dimensions (step S12), and the step of calculating a statistic (step S13) are again carried out for the substrate S using the corrected scanning electron microscope 10. Then, the calculated statistic is again compared with the first threshold value by the correction necessity judgment section 62, and is then compared with the second threshold value if equal to or less than the first threshold value (step S16). Subsequently, as in the first embodiment, when the calculated statistic is more than the second threshold value, the pattern P1 in the scan region is determined to have a measurement error, and the dimensional measurement value is corrected (step S17). Thus, the pattern P1 is inspected by comparison with the CAD data (step S18). If the calculated statistic is equal to or less than the second threshold value, the procedure then proceeds to the inspection of the pattern P1. The procedure described above is repeated for all the inspection regions (steps S19 to S18).

Thus, according to the present embodiment, not only the dimensions are corrected but also the device drift such as the focus and astigmatism are corrected, such that the accuracy of the inspection can be further increased.

(4) Semiconductor Device Manufacturing Method

When the pattern inspection method described above is used in a process of manufacturing a semiconductor device, a pattern can be inspected at a high velocity and with high accuracy, such that the semiconductor device can be manufactured with high throughput at high yield.

More specifically, a substrate is extracted per production lot, and a pattern formed on the extracted substrate is inspected by the inspection method described above. When the substrate is judged as a nondefective product as a result of the inspection, the rest of the manufacturing process is continuously executed for the whole production lot to which the inspected substrate belongs. On the other hand, when the substrate is judged as a defective product as a result of the inspection and can be reworked, rework processing is executed for the production lot to which the substrate judged as the defective product belongs. When the rework processing is finished, the substrate is extracted from the production lot and again inspected. If the extracted substrate is judged as a nondefective product as a result of the reinspection, the rest of the manufacturing process is executed for the production lot finished with the rework processing. In addition, when the rework processing is impossible, the production lot to which the substrate judged as the defective product belongs is disposed of. The cause of the defect is analyzed, and results of the analysis are fed back to a person in charge of designing, a person in charge of an upstream process or the like.

While some of the embodiments of the present invention have been described above, it is obvious that the present invention is not at all limited to the embodiments described above, and various modifications can be made and applied within the technical scope thereof.

For example, in the embodiments described above, when a measurement value is determined to be erroneous after the necessity of a correction has been judged, the measurement value is corrected, and then an inspection is carried out. However, the present invention is not at all limited to the embodiments described above, the inspection may be carried out by pipeline processing separately from the step of calculating a statistic and the step of judging the necessity of a correction by comparison with a threshold value. In this case, the necessity of a correction is judged in real time in parallel with the inspection step, so that it is possible to appropriately know the timing of correcting the measurement value.

Furthermore, while a designated pattern is extracted from the SEM image of the substrate S to calculate a statistic in the embodiments described above, the present invention is not limited to this. For example, a referential pattern may be arranged on the stage in advance, and its SEM image may be acquired to calculate a statistic. Moreover, if the measurement value is separately corrected in the X direction and the Y direction, the inspection accuracy can be further improved. Further, the rate of variation to dimensions is higher in thinner patterns than in thicker patterns, so that it is desirable to select the minimum pattern in the inspection region in designating a pattern. When corrections are separately made in the X direction and the Y direction, the minimum dimension in the X direction should be used for the X direction, and the minimum dimension in the Y direction should be used for the Y direction.

When the number of patterns (the patterns P1 in the example described above) designated for a correction greatly varies depending on the scan region, the reliability of a statistic decreases in the scan region having a small number of patterns, so that a correction should be made only when the scan region contains a number of patterns equal to or more than a previously designated number. When the specification of an inspection apparatus has some margin, statistics are separately calculated for a plurality of pattern dimensions, and the pattern dimensions are independently corrected, such that a more accurate inspection can be achieved.

What is claimed is:

1. A pattern inspection method comprising:
acquiring an image of patterns formed on a substrate by scanning a substrate with a charged beam and detecting a charged particle generated from a surface of the substrate, to acquire an image of patterns formed on the substrate;
measuring dimensional values of selected ones of the patterns based on the image;
calculating a statistic of the dimensional values;
determining whether a correction is needed on the basis of the calculated statistic; and
if so
   correcting the dimensional value, and
   inspecting the selected patterns based on the corrected dimensional value, and
if not, inspecting the selected patterns based on the measured dimensional value.

2. The pattern inspection method according to claim 1, wherein the dimensional values contain a measurement error due to a change in a diameter of the charged beam with time.

3. The pattern inspection method according to claim 2, wherein the inspection is conducted for predetermined regions on the substrate, and
when the change in the diameter of the charged beam with time is negligibly small, a correction value used in a correction processing performed for a first region is also used in a correction processing for a second region different from the first region.

4. The pattern inspection method according to claim 2, wherein the correction of the dimensional value is independently carried out in a first direction and in a second direction perpendicular to the first direction.

5. The pattern inspection method according to claim 1, further comprising:
correcting a device drift.

6. The pattern inspection method according to claim 1, wherein the patterns include a plurality of kinds of patterns different in size, and the selected ones of the patterns have a smallest size among the patterns.

7. The pattern inspection method according to claim 1, wherein the calculating the statistic, the determining whether the correction is needed, and the inspecting the selected patterns are carried out by pipeline processing.

8. The pattern inspection method according to claim 1, wherein the image further includes an image of a referential pattern formed in a place other than the substrate.

9. A pattern inspection apparatus comprising:
a pattern image acquisition unit, the pattern image acquisition unit scanning a substrate with a charged beam and detecting a charged particle generated from a surface of the substrate to acquire an image of patterns formed on the substrate;
a measurement unit which measures dimensional values of selected ones of the patterns based on the image;
a calculation unit which calculates a statistic of the dimensional values;
a judgment unit which determines whether a correction is needed on the basis of the calculated statistic;
a correction unit which corrects the dimensional value if the correction is needed; and
an inspection unit which inspects the selected patterns based on the corrected dimensional value if the correction is needed or based on the measured dimensional value if the correction is not needed.

10. The pattern inspection apparatus according to claim 9, wherein the dimensional values contain a measurement error due to a change in a diameter of the charged beam with time.

11. The pattern inspection apparatus according to claim 10, wherein the inspection unit inspects the pattern for predetermined regions on the substrate, and
when the change in the diameter of the charged beam with time is negligibly small, the correction unit uses a same correction value for a correction processing performed for a first region and a correction processing for a second region different from the first region.

12. The pattern inspection apparatus according to claim 10, wherein the correction unit independently corrects the dimensional value in a first direction and in a second direction perpendicular to the first direction.

13. The pattern inspection apparatus according to claim 9, wherein the correction unit corrects a device drift of the apparatus.

14. The pattern inspection apparatus according to claim 9, wherein the patterns include a plurality of kinds of patterns different in size, and the selected ones of the patterns have a smallest size among the patterns.

15. The pattern inspection apparatus according to claim 9, wherein the inspection unit, the calculation unit and the judgment unit perform the calculating, the determining, and the inspecting by pipeline processing.

16. A semiconductor device manufacturing method comprising carrying out a process of manufacturing a semiconductor device on a substrate when an inspection target pattern for use in the formation of the semiconductor device formed on the substrate is judged to satisfy a required specification of the semiconductor device as a result of an inspection by performing a pattern inspection method, the pattern inspection method comprising:
scanning the substrate with a charged beam and detecting a charged particle generated from a surface of the substrate to acquire an image of patterns formed on the substrate;
measuring dimensional values of selected ones of the patterns based on the image;
calculating a statistic of the dimensional values;
determining whether a correction is needed on the basis of the calculated statistic; and
if so
correcting the dimensional value, and
inspecting the selected patterns based on the corrected dimensional value, and
if not, inspecting the selected patterns based on the measured dimensional value.

17. The semiconductor device manufacturing method according to claim 16, wherein the dimensional values contain a measurement error due to a change in a diameter of the charged beam with time.

18. The semiconductor device manufacturing method according to claim 16, wherein the pattern inspection further comprises correcting a device drift.

19. The semiconductor device manufacturing method according to claim 16, wherein the patterns include a plurality of kinds of patterns different in size, and the selected ones of the patterns have a smallest size among the patterns.

* * * * *